E. B. HESS.
BALL BEARING.
APPLICATION FILED JUNE 22, 1908.
946,438.
Patented Jan. 11, 1910.
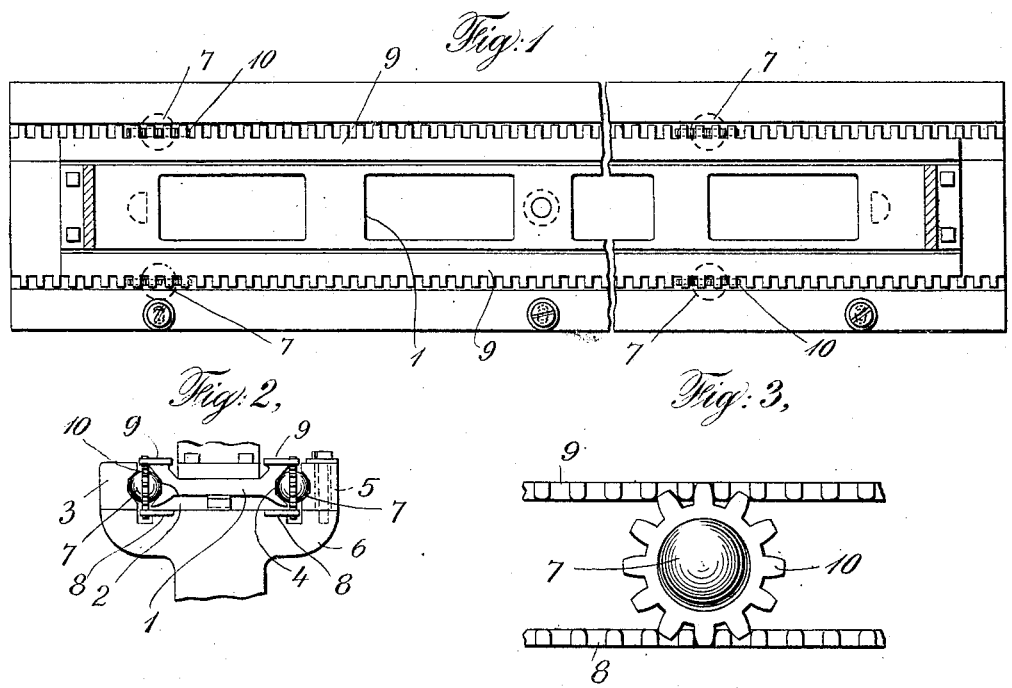

UNITED STATES PATENT OFFICE.

EDWARD B. HESS, OF NEW YORK, N. Y., ASSIGNOR TO ROYAL TYPEWRITER COMPANY, OF NEW YORK, N. Y., A CORPORATION OF NEW JERSEY.

BALL-BEARING.

946,438.  Specification of Letters Patent.  Patented Jan. 11, 1910.

Original application filed December 28, 1907, Serial No. 408,354. Divided and this application filed June 22, 1908. Serial No. 439,709.

*To all whom it may concern:*

Be it known that I, EDWARD B. HESS, a citizen of the United States of America, residing in the borough of Manhattan, city, county, and State of New York, have invented certain Improved Ball-Bearings, of which the following is a specification.

This application is a division of my application filed December 28, 1907, No. 408,354 for improvements in typewriting machines.

In the accompanying drawings: Figure 1 is a plan view; Fig. 2, an end view of Fig. 1; and Fig. 3, a detail front elevation.

This drawing discloses one embodiment of my invention in which there are two ball races and in which the ring gears that encircle the bearing balls are disposed vertically.

1 indicates a reciprocating part. At one side this part is formed with a V-shaped recess 2 forming part of a race-way whose opposite part is formed by the fixed member 3. At the other side the movable member also has a similar V-shaped recess 4 forming one side of a race-way the opposite side of which is formed by the block 5 adjustably mounted on the support 6 to which the member 3 is integrally or rigidly attached. The bearing balls are marked 7 and there may be any appropriate number in each race-way. Each ball is loosely enveloped by a ring pinion or gear 10 meshing with a rack, there being preferably two racks, one 8 carried by the stationary support and the other 9 carried by the traveling part 1. The support may be part of a typewriting machine and the traveling part 1 may be the frame of the carriage upon which is mounted the usual platen. The relative position of the bearing balls and the traveling member of the organization is at all times accurately maintained, and the construction is characterized by comparative absence of friction.

It is contemplated that the fit of the balls within the ring gears shall be such as to permit them to freely turn in any direction.

I claim:

1. The combination with the traversing support of a typewriting machine carriage of a ball bearing comprising a rectilinear ball race, bearing balls therein, annular gears loosely encircling the balls, and racks, one movable with said support and the other stationary, respectively engaged by opposite sides of the gears.

2. The combination with the traversing support of a typewriting machine carriage of a ball bearing comprising a divided rectilinear ball race one part of which is movable with said support and the other stationary, two racks, one rigid with said movable part and the other rigid with said stationary part, balls running in the race and annular gears respectively encircling the balls and meshing with both racks.

In testimony whereof, I have hereunto subscribed my name.

EDWARD B. HESS.

Witnesses:
 JOHN DARBY,
 LEWIS C. MYERS.